US012658429B2

(12) United States Patent
Kimura et al.

(10) Patent No.: US 12,658,429 B2
(45) Date of Patent: Jun. 16, 2026

(54) LITHIUM ION BATTERY NEGATIVE ELECTRODE ACTIVE MATERIAL

(71) Applicant: DAIDO STEEL CO., LTD., Nagoya (JP)

(72) Inventors: Yuta Kimura, Nagoya (JP); Kazuki Minami, Nagoya (JP)

(73) Assignee: Daido Steel Co., Ltd., Nagoya (JP)

(*) Notice: Subject to any disclaimer, the term of this patent is extended or adjusted under 35 U.S.C. 154(b) by 302 days.

(21) Appl. No.: 18/567,303

(22) PCT Filed: Jun. 8, 2022

(86) PCT No.: PCT/JP2022/023207
§ 371 (c)(1),
(2) Date: Dec. 5, 2023

(87) PCT Pub. No.: WO2022/260110
PCT Pub. Date: Dec. 15, 2022

(65) Prior Publication Data
US 2025/0079456 A1　Mar. 6, 2025

(30) Foreign Application Priority Data
Jun. 10, 2021　(JP) ................................. 2021-097385

(51) Int. Cl.
*H01B 1/04* (2006.01)
*H01M 4/38* (2006.01)

(52) U.S. Cl.
CPC .............. *H01M 4/386* (2013.01); *H01B 1/04* (2013.01)

(58) Field of Classification Search
CPC .. H01B 1/00; H01B 1/04; H01M 4/36; H01M 4/386; H01M 4/387; C22C 13/00
See application file for complete search history.

(56) References Cited

U.S. PATENT DOCUMENTS 11,862,787 B2 * 1/2024 Kimura ................. H01M 4/386
12,444,735 B2 * 10/2025 Kimura ................. H01M 4/386

2004/0241548 A1 12/2004 Nakamoto et al.
2013/0084498 A1 * 4/2013 Kimura ................. H01M 4/387
　　　　　　　　　　　　　　　　　　　　429/217
2020/0251723 A1 8/2020 Kimura et al.

FOREIGN PATENT DOCUMENTS

| JP | 2004-319469 A | 11/2004 |
|----|---------------|---------|
| JP | 2017-224499 A | 12/2017 |
| JP | 2018-073650 A | 5/2018 |
| JP | 2020-126835 A | 8/2020 |
| JP | 2021-022438 A | 2/2021 |
| KR | 10-2020-0096876 A | 8/2020 |

OTHER PUBLICATIONS

Salavati-Niasari et al "Nano-sized Cu6Sn5 alloy prepared by a co-precipitation reductive route", Polyhedron 29 (2010) 1796-1800.*
Korean Office Action dated Jun. 24, 2025 in Korean Patent Application No. 10-2023-7042260 with machine English translation.
International Search Report (ISR) (PCT Form PCT/ISA/210), in PCT/JP2022/023207, dated Jun. 8, 2022 (with English translation/English version).
Written Opinion of the International Searching Authority (WO ISA) (PCT Form PCT/ISA/237), in PCT/JP2022/023207, dated Jun. 8, 2022 (Japanese Version).
Japanese Office Action dated May 20, 2025 in Japanese Patent Application No. 2021-097385 with machine English translation.
Extended European Search Report dated Sep. 1, 2025 in European Patent Application No. 22820289.1.

* cited by examiner

*Primary Examiner* — Mark Kopec
(74) *Attorney, Agent, or Firm* — McGinn IP Law Group, PLLC

(57) ABSTRACT

The present invention relates to a lithium ion battery negative electrode active material that includes an Si phase, an Si—Zr compound phase, an Si—X compound phase, and an Sn—Cu compound phase, X being at least one element selected from the group that consists of Fe, Ni, Co, Mn, Ti, V, and Cr, the Sn—Cu compound phase fraction of the whole being 0.1-18 mass %, and the Si phase fraction being 10-90 mass %.

20 Claims, No Drawings

LITHIUM ION BATTERY NEGATIVE ELECTRODE ACTIVE MATERIAL

TECHNICAL FIELD

The present invention relates to a negative electrode active material for a lithium ion battery.

BACKGROUND ART

A lithium ion battery has an advantage of being able to miniaturize with a high capacity and a high voltage, and is widely used as a power supply for mobile phones and laptops. In recent years, it has attracted much expectations as a power supply for power applications such as electric vehicles and hybrid vehicles, and the development thereof has been actively promoted.

In the lithium ion battery, lithium ions (hereinafter referred to as Li ions) move between a positive electrode and a negative electrode for charging and discharging. On a negative electrode side, Li ions are occluded in a negative electrode active material during charging, and Li ions are released from the negative electrode active material during discharging.

In the related art, lithium cobaltate ($LiCoO_2$) is generally used as an active material on a positive electrode side, and graphite is widely used as the negative electrode active material. However, graphite as the negative electrode active material has a theoretical capacity of only 372 mAh/g, and an increased capacity is desired. Therefore, as an alternative material to a carbon-based negative electrode active material, recently, a metal material such as Si (the theoretical capacity of Si is 4198 mAh/g) that can be expected to have an increased capacity has been actively studied.

However, Si has large volume expansion and contraction along with occlusion and release of the Li ions due to occlusion of the Li ions by an alloying reaction with Li. Therefore, in the case where the negative electrode active material is composed of Si alone, an expansion and contraction stress causes Si particles to crack or peel off from a current collector, deteriorating cycle characteristics, which are capacity retention characteristics when charging and discharging are repeated.

In order to reduce such deterioration in cycle characteristics, it has been proposed to alloy Si in the negative electrode active material using Si. For example, as described in Patent Literature 1 below, it is known to provide a Si—Zr compound phase as a Si compound phase together with Si. The Si—Zr compound phase is effective in preventing the expansion of Si and improving the cycle characteristics.

CITATION LIST

Patent Literature

Patent Literature 1: JP2017-224499A

SUMMARY OF INVENTION

Technical Problem

As described above, the Si—Zr compound phase is effective in improving the cycle characteristics, but in addition to the cycle characteristics, there are other characteristics required for the lithium ion battery, such as initial Coulombic efficiency and discharge rate characteristics, and there is still room for improvement in improving comprehensive battery characteristics that take these multiple characteristics into consideration.

The present invention has been made in view of the above circumstances, and an object thereof is to provide a negative electrode active material for a lithium ion battery that can have improved comprehensive battery characteristics in consideration of cycle characteristics, initial Coulombic efficiency, and discharge rate characteristics.

Solution to Problem

Therefore, a negative electrode active material for a lithium ion battery according to the present embodiment includes: a Si phase; a Si—Zr compound phase; a Si—X compound phase; and a Sn—Cu compound phase, in which the element X is one or more elements selected from the group consisting of Fe, Ni, Co, Mn, Ti, V, and Cr, and a proportion of the Sn—Cu compound phase is 0.1 mass % to 18 mass % and a proportion of the Si phase is 10 mass % to 90 mass % in the entire negative electrode active material.

As described above, the negative electrode active material for a lithium ion battery according to the present embodiment includes two or more types of Si compound phases. One of them is a Si—Zr compound phase. The Si—Zr compound phase has an effect of preventing expansion of the Si phase and improving capacity retention characteristics when charging and discharging are repeated, that is, cycle characteristics.

However, in the case where the Si compound phase is composed only of a Si—Zr compound, it is difficult to improve initial Coulombic efficiency and discharge rate characteristics, so that in the present embodiment, a Si—X compound phase is included as the Si compound phase in addition to the Si—Zr compound phase. Here, the element X is one or more elements selected from the group consisting of Fe, Ni, Co, Mn, Ti, V, and Cr.

Since the Si—X compound has characteristics different from those of the Si—Zr compound in terms of a Li occlusion property and conductivity, when the Si—X compound phase is further included as the Si compound phase, it is possible to improve comprehensive battery characteristics in consideration of the cycle characteristics, the initial Coulombic efficiency, and the discharge rate characteristics.

Here, in order to improve the effect of improving the battery characteristics by the Si—X compound phase, it is desirable that a proportion of Zr represented by $[Zr]/([Zr]+[X])$ (where [ ] indicates a content at % of the element in [ ]) is 1% to 30%.

DESCRIPTION OF EMBODIMENTS

Next, a negative electrode active material for a lithium ion battery according to an embodiment of the present invention (hereinafter may be simply referred to as a negative electrode active material) and a lithium ion battery using the present negative electrode active material as a negative electrode (hereinafter may be simply referred to as a battery) will be specifically described. Note that in the present description, "to" indicating a numerical range is used in the sense of including numerical values written before and after it as a lower limit value and an upper limit value, unless otherwise specified.

1. Present Negative Electrode Active Material

The present negative electrode active material includes a Si phase, a Si—Zr compound phase, a Si—X compound phase, and a Sn—Cu compound phase. Here, the element X is one or more elements selected from the group consisting of Fe, Ni, Co, Mn, Ti, V, and Cr.

Elements other than these main constituent elements Si, Zr, Sn, Cu, and the element X are not included except for inevitable ones.

Examples of elements for inevitable impurities here include nitrogen (N), sulfur (S), and phosphorus (P). The respective upper limits of a content in the present negative electrode active material may be N≤0.10 mass %, S≤0.10 mass %, and P≤0.10 mass %.

The Si phase is a phase that mainly includes Si. From the viewpoint that a Li occlusion amount increases, the Si phase is preferably a single phase of Si. However, the Si phase may include inevitable impurities.

A proportion of the Si phase in the entire present negative electrode active material is set to 10 mass % or more from the viewpoint of ensuring an amount of Si that occludes Li ions and obtaining a good initial discharge capacity. In addition, from the viewpoint of preventing a decrease in cycle characteristics due to a relative decrease in an amount of the Si compound phase, the proportion of the Si phase is set to 90 mass % or less. The proportion of the Si phase is more preferably 25 mass % or more, still more preferably 30 mass % or more, and more preferably 70 mass % or less, still more preferably 60 mass % or less.

The Si—Zr compound phase is a phase mainly including $Si_2Zr$, and may inevitably include other Zr silicide phases, such as $Si_4Zr$, $Si_3Zr_2$, $Si_5Zr_4$, $SiZr$, and $SiZr_2$. The Si—Zr compound phase has little expansion due to reaction with Li ions, and thus plays a role of an aggregate that maintains a particle structure, can more effectively prevent disintegration of particles, and can improve capacity retention characteristics when charging and discharging are repeated, that is, the cycle characteristics.

In the present embodiment, the Si—X compound phase is further included as the Si compound phase. The Si—X compound has characteristics different from those of the Si—Zr compound in terms of a Li occlusion property or conductivity. Therefore, in the case where the present negative electrode active material is formed to include the Si—Zr compound phase and the Si—X compound phase as the Si compound phase, it is possible to improve comprehensive battery characteristics in consideration of cycle characteristics, initial Coulombic efficiency, and discharge rate characteristics.

Here, the element X effective in improving the initial Coulombic efficiency is Ni, Co, Ti, V, and Mn. The element X effective in improving the discharge rate characteristics is Ti. Further, the element X effective in improving the cycle characteristics is Fe and Cr. Then, in order to improve the effect of improving the characteristics by the Si—X compound phase, it is preferable that a proportion of Zr represented by [Zr]/([Zr]+[X]) is 1% to 30%. [ ] indicates a content at % of the element in [ ], and at % means atomic percent.

Note that the Si—X compound phase can include only one type of compound, and can also include two or more types of compounds, such as two types of Si—Fe compound and a Si—Ni compound. In this case, [X] in the ratio represented by the above [Zr]/([Zr]+[X]) is a total content at % of two or more types of elements X.

Next, the Sn—Cu compound phase has Li ion diffusivity higher than that of the Si—Zr compound. Comparing Li reactivity, the Si—Zr compound has 100 mAh/g and Sn alone has 930 mAh/g, whereas a Sn—X compound has 150 mAh/g to 600 mAh/g.

That is, in the negative electrode active material according to the present embodiment, a diffusion path for Li ions can be easily ensured by the Sn—Cu compound phase. On the other hand, since a degree of expansion due to the reaction with Li ions is smaller in the Sn—Cu compound phase than in Sn, which has higher reactivity with Li ions, thus an adverse influence on the cycle characteristics due to formation of the Sn—Cu compound can be reduced.

In the present embodiment, a proportion of the Sn—Cu compound phase in the entire present negative electrode active material is 0.1 mass % to 18 mass %. This is because the Sn—Cu compound phase expands due to the reaction with Li ions, although the degree of expansion thereof is lesser than Sn alone, so that in the case where the proportion of the Sn—Cu compound phase is too high, there is a risk that the cycle characteristics decrease. The proportion of the Sn—Cu compound phase is more preferably 3 mass % or more, more preferably 15 mass % or less, and still more preferably 10 mass % or less.

Note that although Sn constitutes the Sn—Cu compound phase, Sn alone which is non-compound phase may be included as an impurity as long as the proportion in the entire present negative electrode active material is 5 mass % or less.

The content of each main element suitable for obtaining the above composition phase is as follows. Note that in the following description, "%" means "mass %" unless otherwise specified.

A content of Si is preferably 45.0% or more, and more preferably 50.0% or more, from the viewpoint of obtaining a high initial discharge capacity. In addition, the content of Si is preferably 85.0% or less, and more preferably 75.0% or less, from the viewpoint of obtaining high cycle characteristics.

A content of Zr is preferably 0.1% or more, and more preferably 1.0% or more, from the viewpoint of obtaining high cycle characteristics. In addition, the content of Zr is preferably 40.0% or less, and more preferably 15.0% or less, from the viewpoint of improving characteristics other than cycle characteristics.

A content of Cu is preferably 0.03% or more, and more preferably 1.2% or more, from the viewpoint of further obtaining the effect of the Sn—Cu compound phase as a Li diffusion path. In addition, the content of Cu is preferably 7.2% or less, and more preferably 6.0% or less, from the viewpoint of preventing the decrease in cycle characteristics due to large expansion of the Sn—Cu compound phase.

A content of Sn is preferably 0.05% or more, and more preferably 1.8% or more, from the viewpoint of further obtaining the effect of the Sn—Cu compound phase as a Li diffusion path. In addition, the content of Sn is preferably 11.0% or less, and more preferably 9.0% or less, from the viewpoint of preventing the decrease in cycle characteristics due to large expansion of the Sn—Cu compound phase.

A total content of the element X is preferably 1.0% or more, and more preferably 5.0% or more, from the viewpoint of preventing a decrease in characteristics other than the cycle characteristics due to a relatively large content of Zr. In addition, the total content of the element X is preferably 40.0% or less, and more preferably 30.0% or less, from the viewpoint of preventing the decrease in cycle characteristics due to a relatively small content of Zr.

The form of the negative electrode active material is not particularly limited. Specifically, it can be exemplified in the form of a flake, a powder, or the like. Preferably, the form of a powder is preferred from the viewpoint of ease of application to the production of negative electrodes. In addition, the negative electrode active material according to the present embodiment may be dispersed in a suitable solvent.

The negative electrode active material according to the present embodiment can be produced, for example, by a method including a step of forming a quenched alloy by quenching a molten alloy having a predetermined chemical composition. In the case where the obtained quenched alloy is not in the form of a powder, or in the case where it is desired to reduce the diameter, a step of forming a powder by pulverizing the quenched alloy with an appropriate pulverizing device may be added. In addition, if necessary, a step of classifying the obtained quenched alloy to adjust the particle size to an appropriate size may be added. Note that the negative electrode active material according to the present embodiment can also be produced by separately preparing Si, a Si—Zr compound, a Si—X compound, and a Sn—Cu compound and then mixing these compounds.

Note that a particle diameter (average particle diameter (d50)) of the negative electrode active material is preferably within a range of 0.1 μm to 20 μm. The average particle diameter (d50) in the present description means a volume basis, and can be measured using a laser diffraction/scattering particle size distribution analyzer, for example, Microtrac MT3000 (manufactured by MicrotracBEL Corp.).

Even in the case where the present negative electrode active material, which is a Si alloy, is used in a lithium ion battery, volume expansion and contraction of the negative electrode active material itself also occurs as a result of charging and discharging reactions, which generates a stress in a mixture layer formed by binding the negative electrode active material with a binder, that is, in a conductive film. In this case, when the binder cannot withstand the stress, the binder collapses, and as a result, the conductive film separates from the current collector, resulting in a risk of a decrease in conductivity in the electrode and a decrease in charging and discharging cycle characteristics. In contrast, in the case where the average particle diameter of the present negative electrode active material is within the above range, i.e., fine particles of 0.1 μm to 20 μm, since a contact area with the binder increases, the collapse of the binder is well prevented, and as a result, the decrease in cycle characteristics can be suitably prevented, which is preferable.

In the above production method, the molten alloy can be obtained specifically by, for example, weighing out respective raw materials such that a predetermined chemical composition is obtained, and melting the weighed raw materials using a melting device such as an arc furnace, a high frequency induction furnace, or a heating furnace.

Specific examples of a method for quenching the molten alloy include liquid quenching methods such as a roll quenching method (a single roll quenching method, a twin roll quenching method, etc.), and atomization methods (a gas atomization method, a water atomization method, a centrifugal atomization method, etc.). In particular, it is desirable to use a roll quenching method, which has a high cooling rate.

Here, in the case of producing the negative electrode active material according to the present embodiment using a molten alloy containing Si, Zr, the element X, Sn, and Cu, specifically, the following method is preferably used.

That is, in the case of applying the roll quenching method, the molten alloy that is discharged into a chamber such as a quenching and recovery chamber and that flows downward continuously (in a rod shape) is cooled on a rotating roll that rotates at a circumferential speed of about 10 m/s to 100 m/s. A material of the above rotating roll is Cu, Fe, or the like, and a roll surface may be plated. The molten alloy is cooled on the roll surface to become a foil or flake alloy material. In this case, the alloy material can be pulverized using an appropriate pulverizing device such as a ball mill, a bead mill, a disk mill, a coffee mill, and mortar pulverization, followed by subjecting classification or further pulverization as necessary, to thereby obtain a negative electrode active material in the form of a powder.

On the other hand, in the case of producing the present negative electrode active material by applying the atomization method, a gas such as $N_2$, Ar, He is sprayed at a high pressure (for example, 1 MPa to 10 MPa) against the molten alloy that is discharged into an atomization chamber and that flows downward continuously (in a rod shape), and the molten metal is pulverized and cooled. The cooled molten metal approaches a spherical shape while free-falling in the atomization chamber in a semi-molten state, and a negative electrode active material in the form of a powder is obtained. In addition, high-pressure water may be sprayed instead of a gas from the viewpoint of improving a cooling effect.

2. Present Battery

The present battery is formed using a negative electrode containing the present negative electrode active material (hereinafter sometimes referred to as the present negative electrode).

The negative electrode includes a conductive substrate and a conductive film laminated on a surface of the conductive substrate. The conductive film contains at least the present negative electrode active material described above in a binder. The conductive film may also contain a conductive agent, if necessary. In the case where a conductive agent is contained, it is easier to ensure a conductive path for electrons.

In addition, the conductive film may contain an aggregate, if necessary. In the case where an aggregate is contained, expansion and contraction of the negative electrode during charging and discharging can be easily prevented, and collapse of the negative electrode can be prevented, so that the cycle characteristics can be further improved.

The conductive substrate functions as a current collector. Examples of a material thereof include Cu, a Cu alloy, Ni, a Ni alloy, Fe, and a Fe-based alloy. Preferably, it is Cu or a Cu alloy. Examples of a specific form of the conductive substrate include a foil form and a plate form. A foil form is preferred from the viewpoint of reducing the volume of the battery and improving the degree of freedom in form.

As a material of the above binder, for example, a polyvinylidene fluoride (PVdF) resin, a fluorine resin such as polytetrafluoroethylene, a polyvinyl alcohol resin, a polyimide resin, a polyamide resin, a polyamideimide resin, a styrene-butadiene rubber (SBR), or polyacrylic acid can be suitably used. These may be used alone or in combination of two or more thereof. Among these, a polyimide resin is particularly preferred from the viewpoint of having high mechanical strength, being able to withstand volume expansion of the negative electrode active material, and effectively preventing the conductive film from peeling off from the current collector due to breakage of the binder.

Examples of the above conductive agent include carbon black such as Ketjen black, acetylene black, and furnace black, graphite, carbon nanotubes, and Fullerene. These may be used alone or in combination of two or more thereof. Among these, preferably, Ketjen black, acetylene black, or the like can be suitably used from the viewpoint of being easy to ensure electron conductivity.

From the viewpoint of conductivity improvement, electrode capacity, and the like, a content of the above conductive agent is preferably 0 to 30 parts by mass, and more preferably 4 parts by mass or more and 13 parts by mass or less, with respect to 100 parts by mass of the present negative electrode active material. In addition, an average particle diameter (d50) of the above conductive agent is preferably 10 nm to 1 μm, and more preferably 20 nm or more and 50 nm or less, from the viewpoint of dispersibility, ease of handling, and the like.

As the above aggregate, a material that does not expand or contract during charging and discharging, or that has very little expansion or contraction can be suitably used. Examples thereof include graphite, alumina, calcia, zirconia, and activated carbon. These may be used alone or in combination of two or more thereof. Among these, preferably, graphite or the like can be suitably used from the viewpoint of conductivity, Li activity, and the like.

From the viewpoint of improving the cycle characteristics and the like, a content of the above aggregate is preferably 10 parts by mass to 400 parts by mass, and more preferably 43 parts by mass or more and 100 parts by mass or less, with respect to 100 parts by mass of the present negative electrode active material. In addition, an average particle diameter of the above aggregate is preferably 10 μm to 50 μm, and more preferably 20 μm or more and 30 μm, from the viewpoint of functionality as an aggregate, control of an electrode film thickness, and the like. Note that the average particle diameter of the above aggregate is a value measured using a laser diffraction/scattering particle diameter distribution analyzer.

The present negative electrode can be produced by, for example, adding necessary amounts of the present negative electrode active material, and, if necessary, a conductive agent and an aggregate to a binder dissolved in an appropriate solvent to form a paste, applying the paste to the surface of the conductive substrate, drying it, and optionally subjecting it to compaction, a heat treatment, or the like.

In the case of forming a lithium ion battery using the present negative electrode, there are no particular limitations on a positive electrode, an electrolyte, a separator, and the like, which are basic components of the battery other than the present negative electrode.

Specific examples of the above positive electrode include those in which a layer containing a positive electrode active material such as $LiCoO_2$, $LiNiO_2$, $LiFePO_4$, and $LiMnO_2$ is formed on a surface of a current collector such as an aluminum foil.

Specific examples of the above electrolyte include an electrolytic solution in which a lithium salt is dissolved in a non-aqueous solvent. In addition, it is also possible to use a polymer in which a lithium salt is dissolved, a polymer solid electrolyte in which a polymer is impregnated with the above electrolytic solution, and the like.

Specific examples of the non-aqueous solvent include ethylene carbonate, propylene carbonate, butylene carbonate, dimethyl carbonate, diethyl carbonate, and methyl ethyl carbonate. These may be used alone or in combination of two or more thereof.

Specific examples of the lithium salt include $LiPF_6$, $LiBF_4$, $LiClO_4$, $LiCF_3SO_3$, and $LiAsF_6$. These may be used alone or in combination of two or more thereof.

Other battery components include a separator, a can (battery case), or a gasket. As for these, as long as they are commonly used in the lithium ion battery, any of them can be appropriately combined to form a battery.

Note that the shape of the battery is not particularly limited, and may be any shape such as a cylindrical shape, rectangular shape, or coin shape, and can be appropriately selected according to a specific application.

EXAMPLES

Hereinafter, the present invention is described more specifically using Examples. Note that "%" in the alloy composition is "mass %" unless otherwise specified.

1. Preparation of Negative Electrode Active Material

Respective raw materials shown in Table 1 below were weighed out. The weighed raw materials were heated and melted using a high frequency induction furnace to obtain molten alloys. Each of the obtained molten alloys was quenched using a single roll quenching method to obtain a quenched alloy ribbon. Note that a roll circumferential speed was 42 m/s, and a nozzle distance was 3 mm. The obtained quenched alloy ribbon was mechanically pulverized using a mortar to thereby prepare a negative electrode active material in the form of a powder. Note that the ratio of each raw material shown in Table 1 is defined so as to obtain the target composition phases shown in Table 2 below. Note that in the target composition phase shown in Table 2, taking Example 1, which is $90\{33[Si]-67(70[Si_2Zr]-30[Si_2Fe])\}-10$ $[Sn_5Cu_6]$, as an example, this means that the ratio represented by (total of Si, $Si_2Zr$, and $Si_2Fe$):$Sn_5Cu_6$ is 90:10 in molar ratio, the ratio represented by Si:(total of $Si_2Zr$ and $Si_2Fe$) is 33:67 in molar ratio, and the ratio represented by $Si_2Zr$:$Si_2Fe$ is 70:30 in molar ratio.

TABLE 1

| | | Chemical composition (mass %) | | | | | | | | | |
| | | Si | Zr | Sn | Cu | Cr | V | Mn | Ti | Ni | Co | Fe |
|---|---|---|---|---|---|---|---|---|---|---|---|---|
| Example | 1 | 54.9 | 26.1 | 6.0 | 4.0 | — | — | — | — | — | — | 9.0 |
| | 2 | 56.3 | 18.7 | 6.0 | 4.0 | — | — | — | — | — | — | 15.0 |
| | 3 | 59.5 | 19.6 | 3.0 | 2.0 | — | — | — | — | — | — | 16.0 |
| | 4 | 57.8 | 11.1 | 6.0 | 4.0 | — | — | — | — | — | — | 21.1 |
| | 5 | 59.2 | 3.6 | 6.0 | 4.0 | — | — | — | — | — | — | 27.2 |
| | 6 | 69.9 | 11.1 | 6.0 | 4.0 | — | — | — | — | — | — | 9.0 |
| | 7 | 73.8 | 11.8 | 3.0 | 2.0 | — | — | — | — | — | — | 9.4 |
| | 8 | 71.9 | 1.0 | 6.0 | 4.0 | — | — | — | — | — | — | 17.1 |
| | 9 | 70.8 | 6.6 | 6.0 | 4.0 | — | — | — | — | — | — | 12.6 |
| | 10 | 79.9 | 5.6 | 6.0 | 4.0 | — | — | — | — | — | — | 4.5 |
| | 11 | 49.8 | 22.2 | 6.0 | 4.0 | — | — | — | — | — | — | 18.0 |
| | 12 | 55.9 | 18.7 | 6.0 | 4.0 | — | — | — | — | 15.4 | — | — |
| | 13 | 69.7 | 11.1 | 6.0 | 4.0 | — | — | — | — | 9.2 | — | — |
| | 14 | 56.6 | 18.7 | 6.0 | 4.0 | — | — | — | — | — | 14.7 | — |
| | 15 | 69.6 | 11.1 | 6.0 | 4.0 | — | — | — | — | — | 9.3 | — |
| | 16 | 57.5 | 18.7 | 6.0 | 4.0 | — | — | — | 13.8 | — | — | — |

TABLE 1-continued

| | | Si | Zr | Sn | Cu | Cr | V | Mn | Ti | Ni | Co | Fe |
|---|---|---|---|---|---|---|---|---|---|---|---|---|
| | 17 | 70.6 | 11.1 | 6.0 | 4.0 | — | — | — | 8.3 | — | — | — |
| | 18 | 56.9 | 18.7 | 6.0 | 4.0 | 14.4 | — | — | — | — | — | — |
| | 19 | 70.2 | 11.1 | 6.0 | 4.0 | 8.7 | — | — | — | — | — | — |
| | 20 | 57.0 | 18.7 | 6.0 | 4.0 | — | 14.3 | — | — | — | — | — |
| | 21 | 70.3 | 11.1 | 6.0 | 4.0 | — | 8.6 | — | — | — | — | — |
| | 22 | 56.4 | 18.7 | 6.0 | 4.0 | — | — | 14.9 | — | — | — | — |
| | 23 | 70.0 | 11.1 | 6.0 | 4.0 | — | — | 8.9 | — | — | — | — |
| | 24 | 53.2 | 17.6 | 9.0 | 6.0 | — | — | — | — | — | — | 14.2 |
| | 25 | 60.7 | 20.1 | 1.8 | 1.2 | — | — | — | — | — | — | 16.2 |
| Comparative | 1 | 52.7 | 37.3 | 6.0 | 4.0 | — | — | — | — | — | — | — |
| Example | 2 | 67.7 | 22.3 | 6.0 | 4.0 | — | — | — | — | — | — | — |
| | 3 | 78.9 | 11.1 | 6.0 | 4.0 | — | — | — | — | — | — | — |
| | 4 | 62.6 | 20.7 | — | — | — | — | — | — | — | — | 16.7 |
| | 5 | 50.1 | 16.5 | 12.0 | 8.0 | — | — | — | — | — | — | 13.4 |
| | 6 | 43.8 | 25.5 | 6.0 | 4.0 | — | — | — | — | — | — | 20.7 |
| | 7 | 85.0 | 2.8 | 6.0 | 4.0 | — | — | — | — | — | — | 2.2 |

2. Confirmation of Composition Phase of Negative Electrode Active Material

The negative electrode active material prepared in each of Examples and Comparative Examples was analyzed by XRD (X-ray diffraction) to confirm whether a Si phase, a Si—Zr compound phase, a Si—X compound phase, and a Sn—Cu compound phase were included. Note that for the XRD analysis, a Co tube was used and an angle range of 2θ=1200 to 200 was measured.

3. Calculation of Si Phase Amount

A method for calculating a Si phase amount (the proportion of the Si phase in the entire negative electrode active material) shown in Table 2 below will be described using Example 1 as an example.

(1) First, the composition phases in the prepared powder are confirmed. In the case of Example 1, as a result of the above XRD analysis, Si, $Si_2Zr$, $Si_2Fe$, and $Sn_5Cu_6$ have been confirmed (see Table 2).

(2) $Si_2Zr$ is 38.1 [Si]-61.9[Zr] in terms of ratio in mass %. Correspondingly, the amount of compounded Si is $26.1 \times 38.1/61.9 = 16.1$ (mass %).

(3) $Si_2Fe$ is 50.1[Si]-49.9[Fe] in terms of ratio in mass %. Correspondingly, the amount of compounded Si is $9.0 \times 50.1/49.9 = 9.1$ (mass %).

(4) Therefore, the Si phase amount obtained by subtracting the amount of the compounded Si from the total amount of Si is calculated as $54.9 - 25.2 = 29.7$ (mass %).

Note that a SnCu phase amount shown in Table 2 means a Sn—Cu compound phase amount (the proportion of the Sn—Cu compound phase in the entire negative electrode active material), which is the sum of the amount of Sn and the amount of Cu in Table 1.

TABLE 2

| | | Target composition phase | Si phase amount (mass %) | SnCu phase amount (mass %) |
|---|---|---|---|---|
| Example | 1 | 90{33[Si]-67(70[Si₂Zr]-30[Si₂Fe])}-10[Sn₅Cu₆] | 29.7 | 10 |
| | 2 | 90{33[Si]-67(50[Si₂Zr]-50[Si₂Fe])}-10[Sn₅Cu₆] | 29.7 | 10 |
| | 3 | 95{33[Si]-67(50[Si₂Zr]-50[Si₂Fe])}-5[Sn₅Cu₆] | 31.4 | 5 |
| | 4 | 90{33[Si]-67(30[Si₂Zr]-70[Si₂Fe])}-10[Sn₅Cu₆] | 29.7 | 10 |
| | 5 | 90{33[Si]-67(10[Si₂Zr]-90[Si₂Fe])}-10[Sn₅Cu₆] | 29.7 | 10 |
| | 6 | 90[{60[Si]-40(50[Si₂Zr]-50[Si₂Fe])}-10[Sn₅Cu₆] | 54 | 10 |
| | 7 | 95[{60[Si]-40(50[Si₂Zr]-50[Si₂Fe])}-5[Sn₅Cu₆] | 57 | 5 |
| | 8 | 90[{60[Si]-40(5[Si₂Zr]-95[Si₂Fe])}-10[Sn₅Cu₆] | 54 | 10 |
| | 9 | 90[{60[Si]-40(30[Si₂Zr]-70[Si₂Fe])}-10[Sn₅Cu₆] | 54 | 10 |
| | 10 | 90{80[Si]-20(50[Si₂Zr]-50[Si₂Fe])}-10[SnsCu₆] | 72 | 10 |
| | 11 | 90{20[Si]-80(50[Si₂Zr]-50[Si₂Fe])}-10[Sn₅Cu₆] | 18 | 10 |
| | 12 | 90{33[Si]-67(50[Si₂Zr]-50[Si₂Ni])}-10[Sn₅Cu₆] | 29.7 | 10 |
| | 13 | 90[{60[Si]-40(50[Si₂Zr]-50[Si₂Ni])}-10[Sn₅Cu₆] | 54 | 10 |
| | 14 | 90{33[Si]-67(50[Si₂Zr]-50[Si₂Co])}-10[Sn₅Cu₆] | 29.7 | 10 |
| | 15 | 90[{60[Si]-40(50[Si₂Zr]-50[Si₂Co])}-10[Sn₅Cu₆] | 54 | 10 |

TABLE 2-continued

| | | | | |
|---|---|---|---|---|
| | 16 | 90{33[Si]-67(50[Si$_2$Zr]-50[Si$_2$Ti])}-10[Sn$_5$Cu$_6$] | 29.7 | 10 |
| | 17 | 90{[60[Si]-40(50[Si$_2$Zr]-50[Si$_2$Ti])}-10[Sn$_5$Cu$_6$] | 54 | 10 |
| | 18 | 90{33[Si]-67(50[Si$_2$Zr]-50[Si$_2$Cr])}-10[Sn$_5$Cu$_6$] | 29.7 | 10 |
| | 19 | 90[{60[Si]-40(50[Si$_2$Zr]-50[Si$_2$Cr])}-10[Sn$_5$Cu$_6$] | 54 | 10 |
| | 20 | 90{33[Si]-67(50[Si$_2$Zr]-50[Si$_2$V])}-10[Sn$_5$Cu$_6$] | 29.7 | 10 |
| | 21 | 90[ {60[Si]-40(50[Si$_2$Zr]-50[Si$_2$ V])}-10[Sn$_5$Cu$_6$] | 54 | 10 |
| | 22 | 90{33[Si]-67(50[Si$_2$Zr]-50[Si$_2$Mn])}-10[SnsCu$_6$] | 29.7 | 10 |
| | 23 | 90[{60[Si]-40(50[Si$_2$Zr]-50[Si$_2$Mn])}-10[Sn$_5$Cu$_6$] | 54 | 10 |
| | 24 | 85{33[Si]-67(50[Si$_2$Zr]-50[Si$_2$Fe])}-15[Sn$_5$Cu$_6$] | 28.1 | 15 |
| | 25 | 97{33[Si]-67(50[Si$_2$Zr]-50[Si$_2$Fe])}-3[Sn$_5$Cu$_6$] | 32 | 3 |
| Comparative Example | 1 | 90{33[Si]-67[Si$_2$Zr]}-10[Sn$_5$Cu$_6$] | 29.7 | 10 |
| | 2 | 90[{60[Si]-40[Si$_2$Zr]}-10[SnsCu$_6$] | 54 | 10 |
| | 3 | 90[{80[Si]-20[Si$_2$Zr]}-10[SnsCu$_6$] | 72 | 10 |
| | 4 | 33[Si]-67(50[Si$_2$Zr]-50[Si$_2$Fe]) | 29.7 | 0 |
| | 5 | 80{33[Si]-67(50[Si$_2$Zr]-50[Si$_2$Fe])}-20[Sn$_5$Cu$_6$] | 29.7 | 20 |
| | 6 | 90{8[Si]-92(50[Si$_2$Zr]-50[Si$_2$Fe])}-10[Sn$_5$Cu$_6$] | 7.2 | 10 |
| | 7 | 95{96[Si]-4(50[Si$_2$Zr]-50[Si$_2$Fe])}-5[Sn$_5$Cu$_6$] | 91.2 | 5 |

| | | Additive element X | Zr/Zr + X (at % ratio) | Initial Coulombic efficiency | Cycle characteristics | Discharge rate characteristic | Comprehensive evaluation |
|---|---|---|---|---|---|---|---|
| Example | 1 | Fe | 70 | D (75) | B (85) | C (3C) | 3 |
| | 2 | Fe | 50 | D (73) | B (87) | C (3C) | 3 |
| | 3 | Fe | 50 | D (73) | B (89) | C (3C) | 3 |
| | 4 | Fe | 30 | D (71) | A (92) | C (3C) | 5 |
| | 5 | Fe | 10 | D (70) | A (95) | C (3C) | 5 |
| | 6 | Fe | 50 | C (82) | C (75) | D (2C) | 1 |
| | 7 | Fe | 50 | C (82) | C (77) | D (2C) | 1 |
| | 8 | Fe | 5 | C (81) | B (80) | D (2C) | 3 |
| | 9 | Fe | 30 | C (80) | B (85) | D (2C) | 3 |
| | 10 | Fe | 50 | B (86) | D (69) | D (2C) | 1 |
| | 11 | Fe | 50 | E (69) | A (90) | C (3C) | 1 |
| | 12 | Ni | 50 | C (80) | C (74) | C (3C) | 3 |
| | 13 | Ni | 50 | B (88) | D (62) | C (3C) | 3 |
| | 14 | Co | 50 | C (80) | C (72) | C (3C) | 3 |
| | 15 | Co | 50 | B (88) | D (60) | C (3C) | 3 |
| | 16 | Ti | 50 | D (76) | C (79) | B (4C) | 3 |
| | 17 | Ti | 50 | B (85) | D (63) | C (3C) | 3 |
| | 18 | Cr | 50 | D (76) | B (82) | C (3C) | 3 |
| | 19 | Cr | 50 | B (85) | C (75) | D (2C) | 3 |
| | 20 | V | 50 | C (80) | C (71) | C (3C) | 3 |
| | 21 | V | 50 | B (86) | D (60) | C (3C) | 3 |
| | 22 | Mn | 50 | C (80) | C (70) | C (3C) | 3 |
| | 23 | Mn | 50 | B (85) | D (60) | C (3C) | 3 |
| | 24 | Fe | 50 | D (74) | B (85) | C (3C) | 3 |
| | 25 | Fe | 50 | D (72) | A (91) | D (2C) | 3 |
| Comparative Example | 1 | — | 100 | D (78) | C (78) | D (2C) | −1 |
| | 2 | — | 100 | C (84) | D (65) | D (2C) | −1 |
| | 3 | — | 100 | B (89) | E (57) | D (2C) | −3 |
| | 4 | Fe | 50 | E (69) | B (89) | D (2C) | −3 |
| | 5 | Fe | 50 | C (82) | D (68) | D (2C) | −1 |
| | 6 | Fe | 50 | E (65) | A (95) | D (2C) | −1 |
| | 7 | Fe | 50 | A (90) | E (55) | D (2C) | −1 |

4. Evaluation of Negative Electrode Active Material

4.1 Preparation of Coin-Type Battery for Charging and Discharging Test

First, 100 by mass of each negative electrode active material, 6 parts by mass of Ketjen black (manufactured by Lion Corporation) as a conductive agent, and 19 parts by mass of a polyimide (thermoplastic resin) binder as a binder were blended and mixed with N-methyl-2-pyrrolidone (NMP) as a solvent to thereby prepare each paste containing the negative electrode active material.

Each coin-type battery was prepared as follows. Here, for sake of a simple evaluation, an electrode prepared using a negative electrode active material was used as a test electrode, and a Li foil was used as a counter electrode, to prepare a coin-type half battery.

First, each paste was applied to a surface of a SUS (stainless steel) 316L foil (thickness: 20 μm) as a negative electrode current collector using a doctor blade method so as to have a thickness of 50 μm, followed by drying to form each negative electrode active material layer. After formation, the negative electrode active material layer was densified by roll pressing. Accordingly, test electrodes according to Examples and Comparative Examples were prepared.

Next, each of the test electrodes according to Examples and Comparative Examples was punched into a disc shape having a diameter of 11 mm to obtain a test electrode.

characteristics were evaluated by performing the above charging and discharging cycle 50 times. A capacity retention rate (discharge capacity after 50 cycles/initial discharge capacity (discharge capacity at first cycle)×100) was obtained from each of the obtained discharge capacities. Then, as shown in Table 3 below, a case of a capacity retention rate of 90% or more is evaluated as "A", a case of 80% to less than 90% is evaluated as "B", a case of 70% to less than 80% is evaluated as "C", a case of 60% to less than 70% is evaluated as "D", and a case of less than 60% is evaluated as "B". The results are shown in Table 2.

TABLE 3

|  | A | B | C | D | E |
|---|---|---|---|---|---|
| Initial Coulombic efficiency | 90% or more | 85% to 90% | 80% to 85% | 70% to 80% | less than 70% |
| Capacity retention rate | 90% or more | 80% to 90% | 70% to 80% | 60% to 70% | less than 60% |
| Discharge rate | 5 C or more | 4 C | 3 C | 2 C | less than 2 C |

Next, a Li foil (thickness: 500 μm) was punched into substantially the same shape as the test electrode to prepare a counter electrode. In addition, a non-aqueous electrolytic solution was prepared by dissolving $LiPF_6$ at a concentration of 1 mol/l in an equivalent mixed solvent of ethylene carbonate (EC) and diethyl carbonate (DEC).

Next, the test electrode was housed in a positive electrode can, and the counter electrode was housed in a negative electrode can, and a separator made of a polyolefin-based microporous film was disposed between the test electrode and the counter electrode. Note that the test electrode should be a negative electrode in a lithium ion battery, but when a Li foil is used as the counter electrode, the Li foil is the negative electrode and the test electrode is the positive electrode.

Next, the above non-aqueous electrolytic solution was injected into each can, and the negative electrode can and the positive electrode can were crimped and fixed to each other.

4.2 Evaluation of Initial Coulombic Efficiency and Cycle Characteristics

One cycle including constant current charging and discharging at a current value of 0.2 mA was performed using the prepared coin-type battery. A value obtained by dividing the capacity (mAh) used for releasing Li by an amount (g) of the active material is an initial discharge capacity Co (mAh/g). Then, the ratio of the discharge capacity to the charge capacity in the above charging and discharging cycle was determined as a percentage of discharge capacity/charge capacity, and was defined as the initial Coulombic efficiency (%).

Then, as shown in Table 3 below, a case of initial Coulombic efficiency of 90% or more is evaluated as "A", a case of 85% to less than 90% is evaluated as "B", a case of 80% to less than 85% is evaluated as "C", a case of 70% to less than 80% is evaluated as "D", and a case of less than 70% is evaluated as "D". The results are shown in Table 2.

After the second cycle, the charging and discharging test was performed at a ⅕C rate. Note that in the C rate, the current value for (charging) and discharging an amount of electricity Co required to (charge) and discharging the electrode in 1 hour is defined as 1C. For example, 5C means (charging) and discharging in 12 minutes, and ⅕C means (charging) and discharging in 5 hours. Then, the cycle 4.3 Evaluation of Discharge Rate Characteristics Using the prepared coin-type battery, Li was occluded to 0.002 V at a current of 0.2 C, and then Li was released to 1.0 V at a current of 0.2 C, 1 C, 2 C, 3 C, 4 C, or 5 C. Using the discharge capacity at 0.2 C as a reference discharge capacity, the C rate at which the discharge capacity was equal to or less than half of the reference discharge capacity was determined. Then, as shown in the above Table 3, a case where a C rate at which a discharge capacity was equal to or less than half of the reference discharge capacity was 5 C or more is evaluated as "A", a case of 4 C is evaluated as "B", a case of 3 C is evaluated as "C", a case of 2 C is evaluated as "D", and a case of less than 2 C is evaluated as "B". The results are shown in Table 2.

In addition, the comprehensive evaluation shown in Table 2 is based on the evaluation results of the initial Coulombic efficiency, the cycle characteristics, and the discharge rate characteristics. Specifically, 5 points is set for the evaluation result "A", 3 points for "B", 1 point for "C", −1 point for "D", and −5 points for "B", and for each Example and Comparative Example, the case where the total score in the above three types of characteristic evaluations is 1 or more is regarded as "acceptable", and the case of less than 1 is regarded as "unacceptable".

The results in Table 2 obtained as described above show the following.

Comparative Examples 1 to 3 are all examples that do not include a Si—X compound phase. However, Comparative Examples 1 to 3 have different Si phase amounts. Compared to Comparative Example 1 in which the Si phase amount is low, in Comparative Example 3 in which the Si phase amount is increased, the initial Coulombic efficiency increases, but on the contrary, the cycle characteristics decrease.

Comparative Examples 1 to 3 are all unacceptable in the comprehensive evaluation in consideration of the three types of characteristics.

Comparative Examples 4 and 5 include a Si—Fe compound phase in addition to the Si—Zr compound phase as the Si compound phase. However, Comparative Example 4 does not include a Sn—Cu compound phase and has higher cycle characteristics but lower initial Coulombic efficiency than those of Comparative Example 1, which has the same Si phase amount.

On the other hand, Comparative Example 5, which has a high Sn—Cu compound phase amount of 20 mass %, has high initial Coulombic efficiency but low cycle characteristics. The comprehensive evaluations for Comparative Examples 4 and 5 are both unacceptable.

Comparative Examples 6 and 7 include a Si—Zr compound phase and a Si—Fe compound phase as the Si compound phase, and further include 10 mass % of a Sn—Cu compound phase. However, in Comparative Example 6, the Si phase amount is as low as being less than 10 mass %, the cycle characteristics are high, but the initial Coulombic efficiency is low. On the other hand, Comparative Example 7, which has a high Si phase amount of more than 90 mass %, has high initial Coulombic efficiency but low cycle characteristics. The comprehensive evaluations for Comparative Examples 6 and 7 are both "unacceptable".

As described above, all Comparative Examples are "unacceptable" in terms of the comprehensive evaluation.

In contrast, all Examples including a Si phase, a Si—Zr compound phase, a Si—X compound phase, and a Sn—Cu compound phase, and having the Sn—Cu compound phase amount specified to 0.1 mass % to 18 mass % and the Si phase amount specified to 10 mass % to 90 mass % have a comprehensive evaluation score of 1 or more and are "acceptable". It can be seen that the comprehensive battery characteristics including the cycle characteristics, the initial Coulombic efficiency, and the discharge rate characteristics are improved.

Looking at each Example in detail, Example 1 to Example 11 include a Si—Fe compound phase as the Si—X compound phase. Here, when comparing Examples 1 and 2, which have the Si phase amount same as that in Comparative Example 1, and Example 6, which has the Si phase amount same as that in Comparative Example 2, with these Comparative Examples, it can be seen that the initial Coulombic efficiency and the discharge rate characteristics are approximately the same, and the cycle characteristics are improved, indicating that the Si—Fe compound phase contributes to the improvement of the cycle characteristics. In particular, in Examples 4, 5, 8, and 9 in which the proportion of Zr represented by [Zr]/([Zr]+[X]) is as low as 30% or less (that is, the proportion of Fe is high), the effect of improving the cycle characteristics is high.

Examples 12 and 13 are examples that include a Si—Ni compound phase as the Si—X compound phase, and when compared to Comparative Example 1 or Comparative Example 2, which has the same Si phase amount, the effect of improving the initial Coulombic efficiency is recognized.

The same applies to Examples 14 and 15 in which a Si—Co compound phase is included as the Si—X compound phase.

Examples 16 and 17 are examples that include a Si—Ti compound phase as the Si—X compound phase, and when compared to Comparative Example 1 or Comparative Example 2, which has the same Si phase amount, the effect of improving the discharge rate characteristics is recognized.

Examples 18 and 19 are examples that include a Si—Cr compound phase as the Si—X compound phase, and when compared to Comparative Example 1 or Comparative Example 2, which has the same Si phase amount, the effect of improving the cycle characteristics is recognized.

Examples 20 and 21 are examples that include a Si—V compound phase as the Si—X compound phase, and when compared to Comparative Example 1 or Comparative Example 2, which has the same Si phase amount, the effect of improving the initial Coulombic efficiency is recognized.

The same applies to Examples 22 and 23 in which a Si—Mn compound phase is included as the Si—X compound phase.

As described above, in Examples, depending on the type of element added as the element X, it is possible to improve any one of the cycle characteristics, the initial Coulombic efficiency, and the discharge rate characteristics.

Although the negative electrode active material for a lithium ion battery and the lithium ion battery according to the present embodiment have been described in detail above, the present invention is not limited to the above-described embodiments and Examples, and various modifications can be made without departing from the scope of the present invention. The present application is based on Japanese patent application No. 2021-097385 filed on Jun. 10, 2021, and the contents thereof are incorporated herein as reference.

The invention claimed is:

1. A negative electrode active material for a lithium ion battery, the negative electrode active material comprising:
   a Si phase;
   a Si—Zr compound phase;
   a Si—X compound phase; and
   a Sn—Cu compound phase,
   wherein the element X is one element selected from the group consisting of Fe, Ni, Co, Mn, Ti, V, and Cr, and
   wherein the negative electrode active material has a proportion of the Sn—Cu compound phase of 0.1 mass % to 18 mass % and a proportion of the Si phase of 10 mass % to 90 mass % in the entire negative electrode active material.

2. The negative electrode active material for a lithium ion battery according to claim 1, having the proportion of the Si phase of 25 mass % to 70 mass %.

3. The negative electrode active material for a lithium ion battery according to claim 1, having the proportion of the Sn—Cu compound phase of 3 mass % to 15 mass %.

4. The negative electrode active material for a lithium ion battery according to claim 3, having the proportion of the Sn—Cu compound phase of 3 mass % to 10 mass %.

5. The negative electrode active material for a lithium ion battery according to claim 1, having a proportion of Zr represented by [Zr]/([Zr]+[X]) (where [ ] indicates a content at % of the element in [ ]) of 1% to 30%.

6. The negative electrode active material for a lithium ion battery according to claim 1, having a content of Si of 45.0 mass % to 85.0 mass % in the entire negative electrode active material.

7. The negative electrode active material for a lithium ion battery according to claim 6, having the content of Si of 50.0 mass % to 75.0 mass %.

8. The negative electrode active material for a lithium ion battery according to claim 1, having a content of Zr of 0.1 mass % to 40.0 mass % in the entire negative electrode active material.

9. The negative electrode active material for a lithium ion battery according to claim 8, having the content of Zr of 1.0 mass % to 15.0 mass %.

10. The negative electrode active material for a lithium ion battery according to claim 1, having a content of Cu of 0.03 mass % to 7.2 mass % in the entire negative electrode active material.

11. The negative electrode active material for a lithium ion battery according to claim 10, having the content of Cu of 1.2 mass % to 6.0 mass %.

12. The negative electrode active material for a lithium ion battery according to claim 1, having a content of Sn of 0.05 mass % to 11.0 mass % in the entire negative electrode active material.

13. The negative electrode active material for a lithium ion battery according to claim 12, having the content of Sn of 1.8 mass % to 9.0 mass %.

14. The negative electrode active material for a lithium ion battery according to claim 1, having a total content of the element X of 1.0 mass % to 40.0 mass % in the entire negative electrode active material.

15. The negative electrode active material for a lithium ion battery according to claim 14, having the total content of the element X of 5.0 mass % to 30.0 mass %.

16. The negative electrode active material for a lithium ion battery according to claim 1, having an average particle diameter (d50) of 0.1 μm to 20 μm.

17. The negative electrode active material for a lithium ion battery according to claim 1, wherein the element X comprises Fe.

18. The negative electrode active material for a lithium ion battery according to claim 1, wherein the element X comprises Ti.

19. A negative electrode active material for a lithium ion battery, the negative electrode active material comprising:
  a Si phase;
  a Si—Zr compound phase;
  a Si—X compound phase; and
  a Sn—Cu compound phase, wherein the element X is one or more elements selected from the group consisting of Fe, Ni, Co, Mn, Ti, V, and Cr, wherein the negative electrode active material has a proportion of the Sn—Cu compound phase of 0.1 mass % to 18 mass % and a proportion of the Si phase of 10 mass % to 90 mass % in the entire negative electrode active material, and having a proportion of Zr represented by [Zr]/([Zr]+[X]) (where [ ] indicates a content at % of the element in [ ]) of 1% to 30%.

20. A negative electrode active material for a lithium ion battery, the negative electrode active material comprising:
  a Si phase;
  a Si—Zr compound phase;
  a Si—X compound phase; and
  a Sn—Cu compound phase, wherein the element X is one or more elements selected from the group consisting of Fe, Ni, Co, Mn, Ti, V, and Cr, wherein the negative electrode active material has a proportion of the Sn—Cu compound phase of 0.1 mass % to 18 mass % and a proportion of the Si phase of 10 mass % to 90 mass % in the entire negative electrode active material, having the proportion of the Si phase of 25 mass % to 70 mass %, and having a proportion of Zr represented by [Zr]/([Zr]+[X]) (where [ ] indicates a content at % of the element in [ ]) of 1% to 30%.

\* \* \* \* \*